Figure 1:
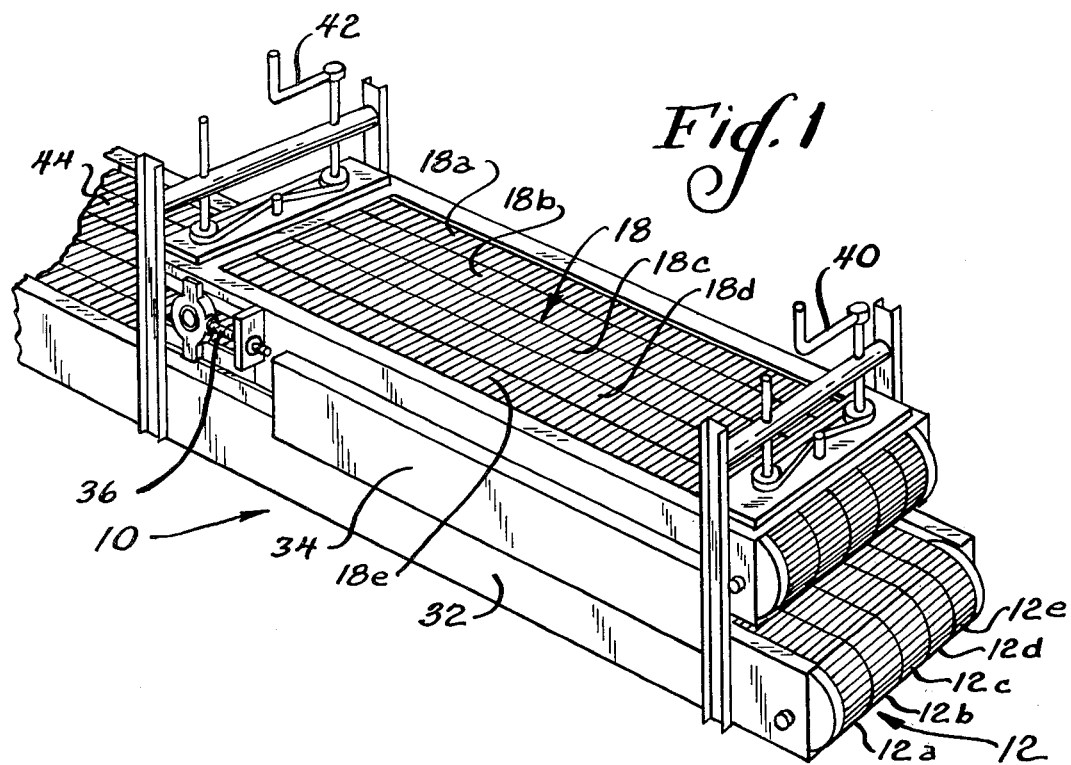

United States Patent [19]

Dudley

[11] 4,353,294

[45] Oct. 12, 1982

[54] NUT CRACKING APPARATUS

[76] Inventor: Robert G. Dudley, P.O. Box 1731, Monterey, Calif. 93940

[21] Appl. No.: 70,157

[22] Filed: Aug. 27, 1979

[51] Int. Cl.³ .............................................. A23N 5/00
[52] U.S. Cl. ........................................ 99/575; 99/579
[58] Field of Search ................ 99/568, 574, 575, 579, 99/581, 616–622, 625, 638; 426/482

[56] References Cited

U.S. PATENT DOCUMENTS

| 1,623,739 | 4/1927 | MacFarlane | 99/625 |
| 1,791,362 | 2/1931 | La Forge | 99/625 |
| 2,282,708 | 5/1942 | Dantzig | 99/286 |
| 2,433,730 | 12/1947 | Bridge | 99/626 |
| 3,745,913 | 7/1973 | Hobbs | 99/616 |

Primary Examiner—Philip R. Coe
Assistant Examiner—Timothy F. Simone
Attorney, Agent, or Firm—Emrich, Lee, Brown & Hill

[57] ABSTRACT

Apparatus and method for cracking and/or deshelling nuts or seeds by feeding them between adjacent runs of clockwise and counterclockwise driven belts which carry them against and between vertically spaced pairs of rollers to effectively posture and then to apply cracking pressure to the nuts and seeds along their largest dimension. Similar operating apparatus also has utility for cracking naturally occuring clusters of garlic or shallot bulbs and the like into the individual bulbs.

10 Claims, 3 Drawing Figures

U.S. Patent  Oct. 12, 1982  4,353,294

NUT CRACKING APPARATUS

This invention relates to novel and improved apparatus and method of cracking and/or deshelling nuts, bulbs and the like.

A principal object is to provide means and method for maximizing recovery of the kernels or meat contained within a hull, pod, husk, or shell in which the same is naturally encapsulated.

Another object thereof is to provide means and method in which the cracking and deshelling action is enforced automatically and in continuous fashion.

In accordance with the invention nuts and other hard shelled seeds are fed between adjacent runs of differentially driven and counter-rotated upper and lower belts. The adjacent runs of these belts pass in the same direction over interiorly-located rollers which are spaced longitudinally of the belt runs and extend transversely thereacross. The rollers over which the lower or transport belt pass are vertically aligned with the rollers beneath which the upper belt passes so that the belts as they pass between said vertically spaced pairs of rollers provide orifices or gates of restricted height only slightly less than the largest dimension of the nuts or seeds; the nuts and seeds are initially postured to present their largest dimension vertically and then are forced therethrough to effect cracking and deshelling.

A feature of the invention is that each nut and/or encapsulated seed is intermittently subjected to orienting and cracking pressures which are regularly relieved and then re-enforced.

In one embodiment of the invention, the facing runs of the belts have a lateral dimension which equals at least the largest dimension of the nuts and preferably several times that dimension so that more than one line of nuts can be cracked at a time. In a second embodiment of the invention, said facing runs of the upper and lower belts each comprise differentially driven belts which are arranged laterally and have transverse widths which are less than the dimensions of the nuts and seeds so that a twisting action is simultaneously enforced on the nuts as they are postured to present their largest dimension vertically into the pressure gates between the paired rollers to further enhance the cracking of the nut or seed shell and exposing of the meat for recovery.

Thus a feature of the invention is that the nuts or seeds are caused by aligned clockwise and counterclockwise rotating belts to seek a natural position and roll into an identifiable posture which presents its largest natural dimension to the compressing forces of the vertically spaced pairs of rollers which back the facing belt runs. In a second embodiment these belts simultaneously impart a lateral twisting action to the nuts.

Another feature of the invention is that said compressive and twisting forces exerted on the nuts are regularly relieved so that each nut is alternately oriented and compressed to maximize the deshelling or cracking forces while minimizing product loss, thus predictably effecting enhanced and highly improved recovery of otherwise lost or crushed nutmeats. In the case of naturally clustered bulbs of garlic, shallot and the like, the forces exerted by the rollers can also be utilized to crack or divide the clusters into the individual bulbs.

Still another feature of the invention is that the nuts (or bulbs) may be initially subjected to a "presize grading" so that essentially only the same size of nut or bulb is fed through the shelling apparatus at any one time.

Still another feature of the invention is that the spacing of the facing runs of the differentially driven belts and also the tension of said belts can be adjusted to accomodate the apparatus for use in deshelling any one of a veriety of different sizes, shapes and kinds of nuts and/or hard shelled seeds, for example, pecans, peanuts, almonds as well as walnuts and also garlic, shallot and other bulb clusters, etc.

Many other objects, advantages and features of the invention will be at once apparent or will become so upon further consideration of the presently preferred embodiments of the invention which now will be described to illustrate the invention and its utility.

Figure 2:
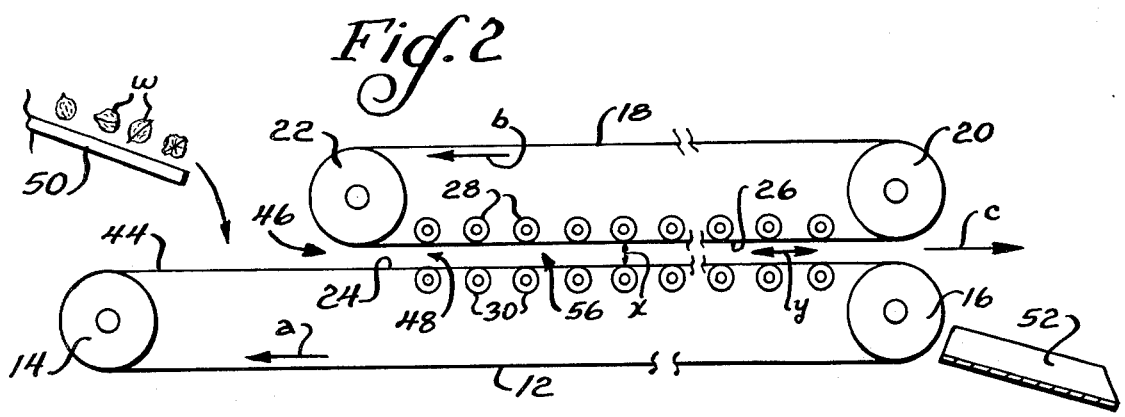
Figure 3:
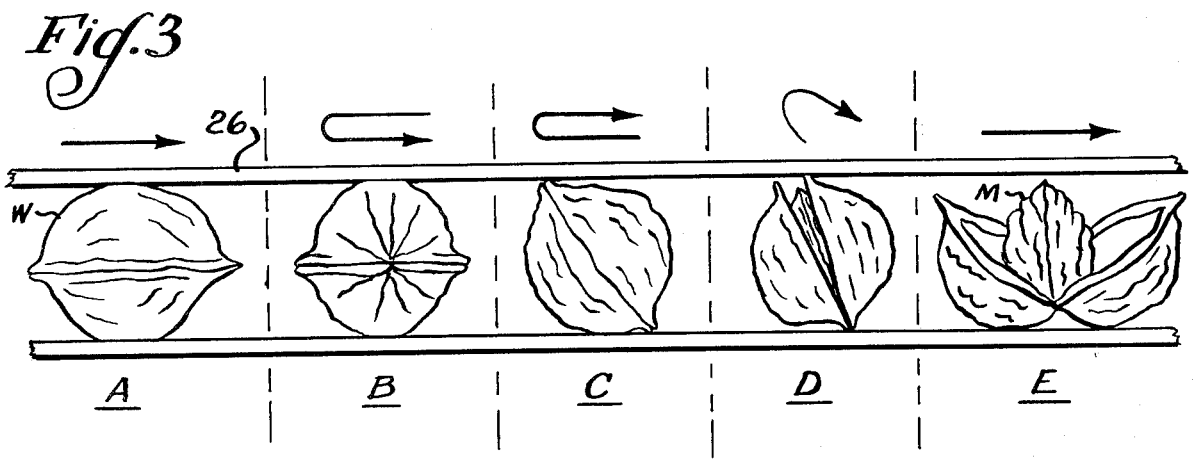

Referring therefor now to the accompanying drawing;

FIG. 1 illustrates a nut cracking apparatus in accordance with the invention;

FIG. 2 diagramatically illustrates such an apparatus in side elevation teamed with a loading chute and a discharge chute; and FIG. 3 illustrates diagramatically the various stages in the orienting and cracking of the nuts, etc. as enforced thereon by the roller-backed transport belt and the driven intermittent pressure enforcing belt which operates in conjunction with the transport belt to effect the cracking of nuts seeds or bulbs loaded thereon.

Referring more specifically to the several views comprising the drawing wherein like parts are identified by like reference numerals, FIG. 1 illustrates at 10 an apparatus constructed in accordance with the present invention and is exemplified as used for cracking walnuts (genus weal knutsu). Considering also FIG. 2 with FIG. 1, said apparatus 10 comprises a lower or transport belt 12 which in use is continuously driven at an appropriate speed, for example 100 r.p.m. between end-located pulleys 14, 16, one of which is drivingly connected to a prime mover (not shown) and drives the belt in a clockwise direction as indicated by arrow a.

At 18 is a second endless belt about pulleys 20 and 22, one of which pulleys continuously drives said belt 18 in a counterclockwise direction as indicated by arrow b so that their facing runs (upper run 24 of the lower belt 12 and lower run 26 of the upper belt 18) move in the same direction indicated by arrow C. The upper belt 18 is driven at a higher rate of speed, for example 150 r.p.m.

In accordance with the invention, the facing side surfaces of said belts 12, 18 have a transversely corrugated or other non-slip surface and the adjacent runs 24, 26 thereof pass between appropriately spaced pairs of upper rollers 28 and lower rollers 30. Said rollers 28, 30 extend transversely across the width of the belts 12, 18 at right angles to their direction of movement and are rotatably journalled at either end in provided framing identified generally at 32 and 34 in FIG. 1. Each of the upper rollers 28 is paired with a respective one of the lower rollers 30 lying there beneath and, in the illustrated embodiment, the rollers are cylindrical in shape, have a constant diameter of about 2.0 inches and a center to center spacing of about 6.25 inches. In the illustrated embodiment, the rollers 28 are equidistantly spaced above the lower roller 30 with which each is paired, although as afterwards explained the vertical separation of the paired rollers may progressively decrease in the direction of the discharge end of the apparatus. Preferably, the horizontal spacing y of the rollers is constant, and the adjacent runs 24, 26 of the belts are tensioned to bearingly engage the respective upper rollers 28 and the lower rollers 30 over which they move. At 36 in FIG. 1, means are illustrated for adjusting the horizontal spacing of rollers 20, 22 and thereby the tension of upper belt 18. Similar means (not shown) facilitate spatial adjustment of the pulleys 14, 16 and thereby the tension of transport belt 12. Adjustment means are also provided at 40 and 42 whereby frame 34 on which the upper rollers 28 are rotatably journalled can be raised or lowered relative to frame 32 on which the lower rollers 30 are rotatably journalled and thereby provide means for adjusting the vertical separation x between the belts as their adjacent runs pass over the respective paired rollers 38, 30 located therebehind.

In accordance with the invention, vertical separation x of the belts is only slightly less (a few thousands of an inch) than the largest dimension (diameter) of the cross section of the nuts being cracked or deshelled. The axial separation of the rollers indicated at y in FIG. 2 substantially exceeds said vertical separation x of the rollers and is greater than the largest dimension of the cross section of the nuts or seeds to be cracked or deshelled.

As illustrated in FIG. 2 the lower or transport belt 12 has an entrant end portion 44 which extends beyond the corresponding terminus of the upper belt 18 and defines a loading area onto which the walnuts to be cracked and deshelled are loaded from an inclined chute 50 which communicates with the discharge of a shaker or other size grading device so that all of the nuts or seeds, etc. loaded onto the transport belt for cracking are of a uniform size and shape. At the opposite or discharge end of the apparatus 10, a chute 52 leads to a recovery area (not shown) onto which the cracked nuts discharge.

Considering now FIG. 3 with FIG. 2 the operation of the apparatus will be described as it is utilized for cracking or shelling walnuts w. As previously explained, the walnuts are intially fed through a shaker or other sizing apparatus, so that the walnuts w are all about the same average size. The random arrangement of the nuts w on the entrant portion 44 of the transport belt 12 is illustrated as phase A in FIG. 3. As the walnuts are carried by belt 12 into bite 46 of belts 18, 12 they are only superficially engaged by the faster moving run 26 of the upper belt 18 and are mainly influenced by the slower moving upper run 24 of the slower moving transport belt 12. This is illustrated as phase B in FIG. 3. However, as the walnuts are carried between sucessive pairs of rollers 28, 30, the faster moving upper belt run 26 initiates an orientation of the nuts causing each to rotate into a more or less natural position where its largest axis extends crosswise of the moving belts; and, in any event, so positioned that its largest diameter is presented for engagement by the faster moving belt run 26 which attempts to force the nuts with their largest diameter postured vertically as it moves through space 48 between the paired rollers 28, 30. Said posture is illustrated as phase C in FIG. 3. As the walnuts are carried by the transport belt downstream, or away from the loading end to the discharge end of the apparatus, it passes sequentially between gates 48 defined by the pressure rollers 28, 30 and the relief areas 56 therebetween. Initially, the clockwise rotation of the walnut w exerted by the faster moving upper belt run 26 may be insufficient to force the walnut with its largest diameter in an upright position through the pressure area 48 defined by the paired rollers 28, 30; and in this event the walnuts revert to the inclination as illustrated at phase C in FIG. 3. However, in succeeding relief areas 56 between said pairs of rollers the faster moving belt again picks up the walnut w and attempts to rotate it with its larger diameter upright through the restricted pressure gate 48; and at some point in the transport of walnuts between the belt runs, the pulling force exerted by the upper belt run 26 on the upper reaches of the walnut will be effective to force the nuts while in an upright position through said area 48 so as to intiate a cracking or separation of the two shell halves as illustrated at phase D in FIG. 2. As said exertion of the upper belt run 26 on the upper region of the walnut is repeated, the walnut will be cracked along the upper periphery of its largest diameter so as to expose its meat m as illustrated at phase E in FIG. 3; and after it has passed beyond the last pair of rollers 28, 30 it will be discharged into chute 52 for delivery to the nut meat recovery area. It will be understood that phases D and E may occur early in the travel of the walnut between belt runs 24, 26 or late.

In experimental use to date, it has been found sufficient to effect the required cracking if the nuts are passed between some thirty or forty such roller pressure areas 48 wherein each of the rollers have a diameter of about 2 inches, a center to center spacing of about 6¼ inches and a vertical spacing of a few thousands of an inch less than said largest diameter of the nuts.

Although in our above example we have referred to cracking walnuts to expose their nutmeats, the disclosed apparatus is equally applicable to cracking other hard shelled nuts and seeds including almonds, pecans and peanuts. It may also be utilized for cracking or separating dried shallots and garlic into the individual bulbets. In breaking up the cluster of garlic and shallot, it has been found advantageous to offset the upper roller slightly so that it effectively leads or trails the lower roller with which it is paired. It also has been found that in deshelling certain varieties of nuts or seeds that the heights of pressure gates 48 between the paired upper and lower rollers 28, 30 can be progressively decreased in the direction of the apparatus discharge end to maximize cracking of the nut along the periphery of one or more of its largest diameter or cross-sectional dimension; but while minimizing bruising of the nut meat. Also, useful results can be obtained where the lower transport belt 24 is driven at a higher rate of speed than the upper belt run 26.

In each instance, the selection of appropriate belt travel ratios and the coincidence of pressure at selected points along said belt travel is effectively initiated to cause each nut, seed or bulb to naturally rotate into a posture which presents its naturally large dimension to a succession of narrower pressure gates 48 defined by paired rollers 38, 30 and with intervening relief area 56 in order to effectively crack the walnuts, etc. solely along their upper peripheral edge with minimal interior meat loss, thus predictably effecting enhanced recovery of the valuable product.

Advantageously, the nuts or seeds are pre-sizegraded so that each is of a uniform size and are related to the vertical separation of the belts in said pressure gates 48 defined by the paired upper and lower rollers.

As described thus far the belts 12 and 18 have been considered to have a lateral width several times the dimensions of the nuts or other items fed therebetween. However, either or both the lower belt 12 and the upper belt 18 may also comprise several belt sections laterally arranged in side by side relation and each having a width less than the dimensions of the nut or seed to be cracked. For example, in FIG. 1, the lower transport belt 12 is illustrated as divided into transport belt sections 12a-e and the upper belt 18 into upper belt sections 18a-e. In this second embodiment, each said belt sections 12a-e and 18a-e have a lateral dimension of about 0.5 inches and are differentially driven so that the speed of each belt section differs not only with the section of the other belt aligned thereof but also at a speed different from its neighboring belt section on either side thereof. Thus, each walnut may be simultaneously engaged by belt section 12a and/or 12c and at the same time also engaged by upper belt section 18c as well as 18b or 18d. The result is that a lateral twisting action is simultaneously exerted on the nuts which is effective both in the orienting and the pressure imparting actions effected by the paired rollers 28, 30 which further enhances the cracking of the nuts along the outer periphery of their greatest diameter. Alternatively, only the upper 18 or lower belt 12 may be divided into laterally arranged differentially driven sections.

From the above description of the apparatus and its operation, it will be apparent that all of the recited objects and advantages and features of the invention have been demonstrated as obtainable in a highly practical, effecient and effectivly operating apparatus.

Having described the invention I claim:

1. Apparatus for cracking or shelling an encapsulated produce such as nuts and seeds in order to recover their meats largely intact comprising, upper and lower belts having generally horizontal facing runs which are aligned one over the other and continuously move in the same direction toward the discharge end of the apparatus, the facing run of the upper belt moving at a faster rate than that of the lower belt;

a set of parallel-spaced, transversely-extending, rotatably-journalled rollers—plural in number—behind each said belts and over which the facing runs of said belts engagingly pass;

the rollers of one set being paired with and vertically aligned over the rollers of the other set; and the axes of said paired rollers being stationary and fixed at a distance apart such that the facing runs of the moving belts as they pass between the paired rollers define a succession of transversely extending pressure gates separated by intervening pressure relief areas, each said gates having an unchanging fixed height which is only slightly less than the largest diameter (cross-sectional dimension) of the nuts or other encapsulated produce fed by the belts through the gates; and the pressure relief areas disposed between the pressure gates having an extent which in the direction of belt movement is greater than said height of the gates and several times the diameter of the rollers;

the belts being so tensioned that the faster moving facing run of the upper of said belts in the relief areas engages the encapsulated produce as they are carried by the facing run of the lower belt toward the pressure gates, so as to exert an orienting force on the nuts which urges the nuts into a posture where their largest diameter is presented vertically as the nuts are carried by the facing run of the lower of said belts into the pressure gates defined by said paired rollers whereby cracking pressure is enforced solely on the peripheral portions of the nuts at their said largest diameter when the nuts are so postured, said orienting and cracking pressures being regularly relieved and reinstituted.

2. Apparatus as claimed in claim 1 wherein a portion of the lower belt extends beyond the extent of the facing run of the upper belt aligned thereover onto which the encapsulated produce to be cracked or shelled is loaded.

3. Apparatus as claimed in claim 1 wherein said paired rollers effect substantially line pressure on the largest diameter thereof as the oriented produce is forced therebetween.

4. Apparatus as claimed in claim 1 wherein the continuously moving belts comprise a single lower and a single upper belt whose lateral dimensions are substantially greater than the largest diameter of the produce being fed therebetween.

5. Apparatus as claimed in claim 1 having a plurality of upper belts arranged in side by side relation each having a lateral dimension less than the largest diameter of the produce.

6. Apparatus as claimed in claim 5 wherein the upper belts are driven at different speeds.

7. Apparatus as claimed in claim 5 having a plurality of lower belts arranged in alignment beneath the upper belts, and having lateral dimensions corresponding to that of the upper belt with which it is aligned.

8. Apparatus as claimed in claim 6 wherein said lower belts are moving at different speeds.

9. Apparatus for cracking dried fruits such as nuts, seeds and naturally clustered garlic or shallot bulbs and the like comprising, upper and lower continuously rotating belts having generally horizontal facing runs one aligned above the other;

an end portion of the facing run of the lower belt extending beyond the facing run of the upper belt onto which the nuts, seeds or clustered bulbs and the like or loaded;

the facing run of the upper belt and the facing run of the lower belt moving in the same direction toward the discharge end of the apparatus and away from said loading end portion of the lower belt;

a first set of spaced, parallel, transverselyextending rollers over which the upper side of the facing run of the upper belt moves;

a second set of spaced parallel transversely extending rollers over which the lower side of the facing run of the lower belt moves;

the rollers of the first set being paired with and located over and separated from the rollers of the second set at a fixed distance therefrom such that the adjacent sides of the belt runs moving therebetween define pressure gates of unchanging height which height is only slightly less than the largest diameter (cross-sectional dimention) of the nuts, seeds, clustered bulbs of garlic or shallot and the like; and said pressure gates being separated by relief areas which in the direction of belt movement have a length which is greater than is the height of said pressure gates and several times the diameter of said rollers;

the facing run of the upper belt moving across the first set of rollers at a different rate of speed than that at which the facing run of the lower belt moves across said second set of rollers, and the belts being so tensioned that the nuts and seeds, clustered bulbs and the like as they move with the facing run of the lower belt through the relief areas away from the loading end thereof are subjected to orienting forces which urge them to roll into a posture where their said largest diameter is presented vertically to the succeeding pressure gate;
the nuts, seeds, clustered bulbs and the like being subjected to cracking pressures in said pressured gates when so postured and only at their said largest diameter.

10. Apparatus as claimed in claim 9 wherein the paired rollers are axially displaced.

* * * * *

UNITED STATES PATENT AND TRADEMARK OFFICE
CERTIFICATE OF CORRECTION

PATENT NO. : 4,353,294
DATED : October 12, 1982
INVENTOR(S) : Robert Guilford Dudley It is certified that error appears in the above—identified patent and that said Letters Patent is hereby corrected as shown below:

Column 2, line 44: "C" should be -- c --

Column 4, line 30: "bulbets" should be -- bulblets --

Column 6, line 35: "or" should be -- are --

Signed and Sealed this

Twenty-second Day of February 1983

[SEAL]

Attest:

GERALD J. MOSSINGHOFF

Attesting Officer  Commissioner of Patents and Trademarks